United States Patent [19]

Kaplan

[11] Patent Number: 4,785,456
[45] Date of Patent: Nov. 15, 1988

[54] SELF-CONTAINED LASER SYSTEM

[75] Inventor: Robert A. Kaplan, Huntington Station, N.Y.

[73] Assignee: Lasers for Medicine Inc., Hauppauge, N.Y.

[21] Appl. No.: 147,177

[22] Filed: Jan. 22, 1988

Related U.S. Application Data

[63] Continuation-in-part of Ser. No. 851,245, Apr. 14, 1986.

[51] Int. Cl.$^4$ ............................................... H01S 3/00
[52] U.S. Cl. ......................................... 372/38; 372/35
[58] Field of Search ...................... 372/38, 35; 378/34

[56] References Cited

U.S. PATENT DOCUMENTS

| | | | |
|---|---|---|---|
| 3,896,396 | 7/1975 | Whitehouse et al. | 378/38 |
| 4,061,986 | 12/1977 | Barker | 372/38 |
| 4,329,662 | 5/1982 | Yagi et al. | 372/38 |
| 4,706,252 | 11/1987 | Egawa et al. | 372/38 |
| 4,745,614 | 5/1988 | Egawa et al. | 372/38 |

*Primary Examiner*—Leon Scott, Jr.
*Attorney, Agent, or Firm*—Kane, Dalsimer, Sullivan, Kurucz, Levy, Eisele & Richard

[57] ABSTRACT

A self-contained, freely movable laser system includes a laser, an energy storage unit such as a battery, and a sealed heat exchanger for removing excess heat from the laser. The laser system needs only a standard low voltage AC power source for operation.

5 Claims, 8 Drawing Sheets

SELF-CONTAINED LASER SYSTEM

BACKGROUND OF THE INVENTION

This application is a continuation-in-part of U.S. application Ser. No. 851,245 filed Apr. 14, 1986 and still pending.

FIELD OF THE INVENTION

This invention pertains to a high-power laser system with a built-in energy source and closed cooling cycle so that it can be utilized by simply connecting it to a standard low tension distribution network.

DESCRIPTION OF THE PRIOR ART

Present optically pumped solid state laser systems typically have a line power to laser output efficiency of 1 to 2%. This represents a combination of losses incurred in (1) transforming AC electrical power to the DC power used to operate typical pump sources (arc lamps or laser diodes), (2) conversion of DC electrical power to usable pump light, (3) spatial and spectral coupling of that pump light to the laser medium and (4) the quantum defect in the pumping process. As a consequence, to achieve laser outputs in excess of 100 watts requires a power input between 5 and 10 Kw. Furthermore, the power losses all eventually appear as heat and must be removed from the system.

Therefore, in general, solid-state laser systems used for various medical and industrial applications have two major facility requirements. First, they must be provided with an electrical power source capable of delivering the high instantaneous power necessary to run the laser. Usually such power sources comprise special installations, not commonly available in commercial or residential locations, which deliver electric power either at a high current or at a high voltage level or both. Second, since laser systems produce large amounts of heat, they must be connected to a heat sink, typically comprising a heat exchanger with running water. As a result, solid-state laser systems are normally installed semi-permanently adjacent to their power source and water supply, and cannot be moved to an arbitrary location. Also their power and cooling requirements would render them impractical for use in such locations as physician's offices.

Furthermore, the peak power must be delivered instantaneously on demand; the system must also be designed to satisfy this requirement. Thermal focusing and birefringence (Ref. 1) results in a variation in resonator parameters as the pump power (and thus the temperature gradiant in the rod) is changed. The effect of this is usually a slow change in output power over a period of about 1 second (the thermal time-constant of the laser rod) following a step change in pump power. Typically, instantaneous power delivery is achieved by keeping the laser pump input at, or near the value required for the anticipated output and switching the laser on via an intracavity shutter. Consequently, even though in some applications, such as those in therapeutic medicine, the laser system is used intermittently resulting in a low duty cycle so that the average power and cooling requirements are substantially less than the peak requirements, in present versions of these laser systems, the power source and cooling must be designed, however, to supply the peak requirements.

OBJECTIVES AND SUMMARY OF THE INVENTION

In view of the above it is a principal objective of the present invention to provide a system which can be operated from a standard household voltage and current so that the specialized power sources are not required.

A further objective is to provide a self-contained laser system which is freely movable from one location to another.

A further objective is to provide a laser system with a closed cooling cycle such that external cooling means are unnecessary.

Other objectives and advantages of the invention shall become apparent from the following description of the invention. Briefly, the essential features of this invention are an energy management subsystem, solid-state laser, cooling subsystem and microprocessor control subsystem designed to enable the entire solid-state laser system to deliver powers in excess of 100 watts for short periods of time instantaneously on demand, while requiring connection only to a conventional 110-120 volt single phase AC power distribution network.

The energy management subsystem comprises an energy storage means which is capable of delivering the peak power required by the solid-state laser for short periods of time, typically about 10 minutes. This far exceeds the maximum continuous duration of laser emission required for many applications, for example high power laser therapy. The energy storage means is recharged from the 110-120 volt AC line power source during the interpulse period. The cooling subsystem need only be designed to remove the average power of the system, which is substantially less than the peak power requirement. Sufficient thermal buffer is provided by the cooling water to limit the temperature rise during the peak power operation. The cooling subsystem removes heat via a closed cycle water-to-air heat exchanger.

The laser itself must be capable of achieving its maximum power output in a very short time (typically less than 0.1 second) after demand of output. This is achieved by design of a resonator which is insensitive to the normal effects of thermal focusing which occurs in sold-state lasers.

As an additional embellishment, the cooling system of the present invention utilizes copper tubing to maximize cooling efficiency. To minimize the problem of copper ionization which could interfere with the triggering and operation of the laser pump lamp, the copper tubing is only filled with water during operation of the laser which is relatively infrequent.

Among safety features of the invention shown herein are a key switch, cover interlock, a laser head shutter disabled while in standby, a separate shutter position sensor, a microprocessor watchdog circuit, a continuous laser output measurement with automatic shutdown if out of range, and a laser shutter interlocked with the fiber delivery system.

DETAILED DESCRIPTION OF THE INVENTION

Figure 1:
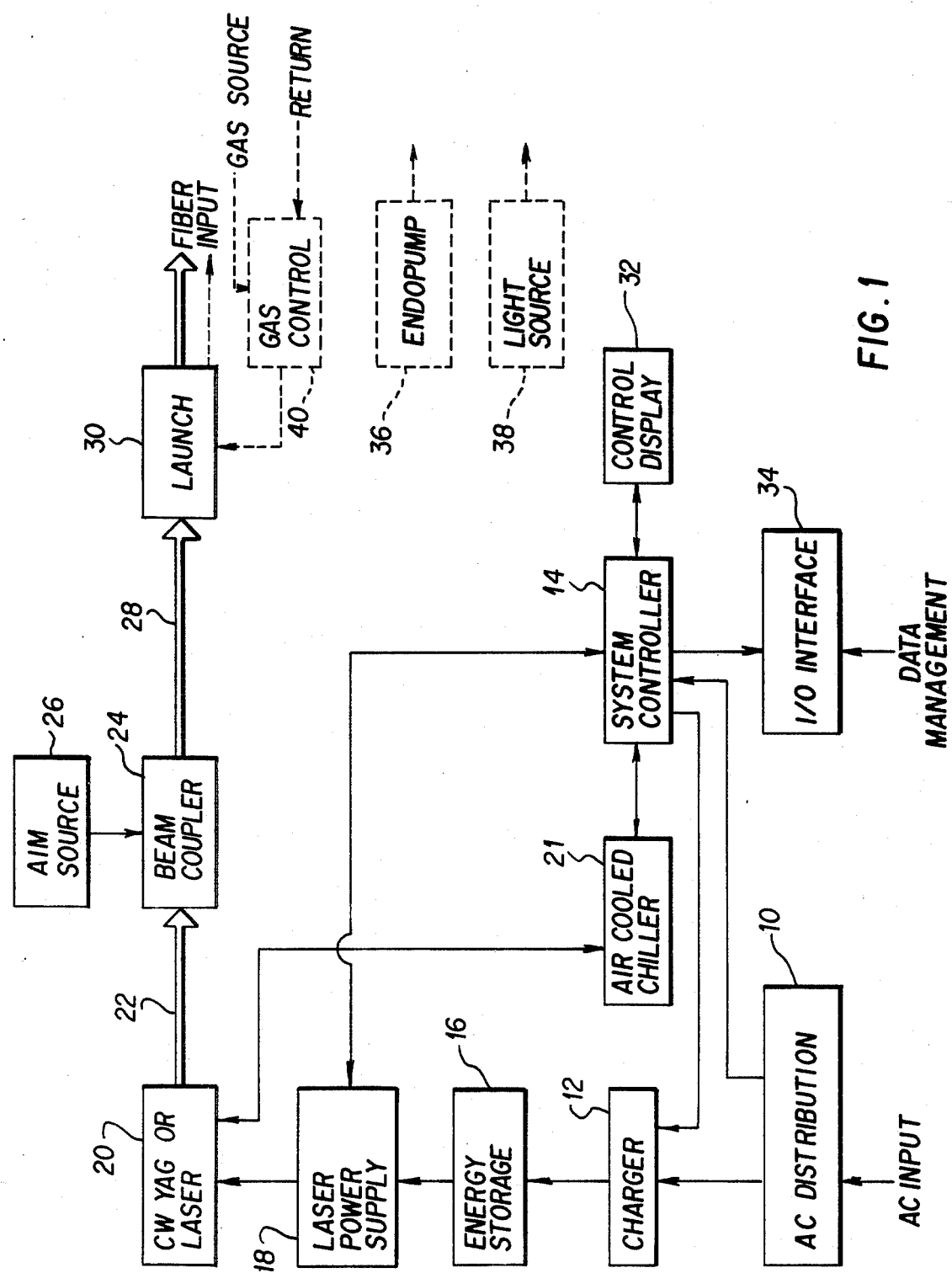
FIG. 1 shows in diagrammatic form the elements of the subject invention.

Referring now to FIG. 1, a self-contained laser system according to this invention comprises an AC power distribution network 10 which receives AC power from a standard single phase 110-120 VAC 10-20 amp line (such as for example a wall socket) and distributes power to a charger 12 and a system controller 14. The charger is used to recharge the energy storage means 16. In a typical embodiment the charger is a battery charger and the energy storage means is a sealed cell lead acid battery. Such chargers are readily available and may comprise a step-down transformer coupled to a full wave rectifier bridge and filter circuits for smoothing the rectifier output. However, to minimize the RMS AC current drain from the line, a switch-mode supply with power conditioning is preferably employed.

Energy storage means 16 is used to feed a laser power supply 18 which is used to drive a standard continuous wave or Q-switched YAG laser 20 which is connected to an air cooled chiller 21 which is used to cool the laser 20.

Figure 2:
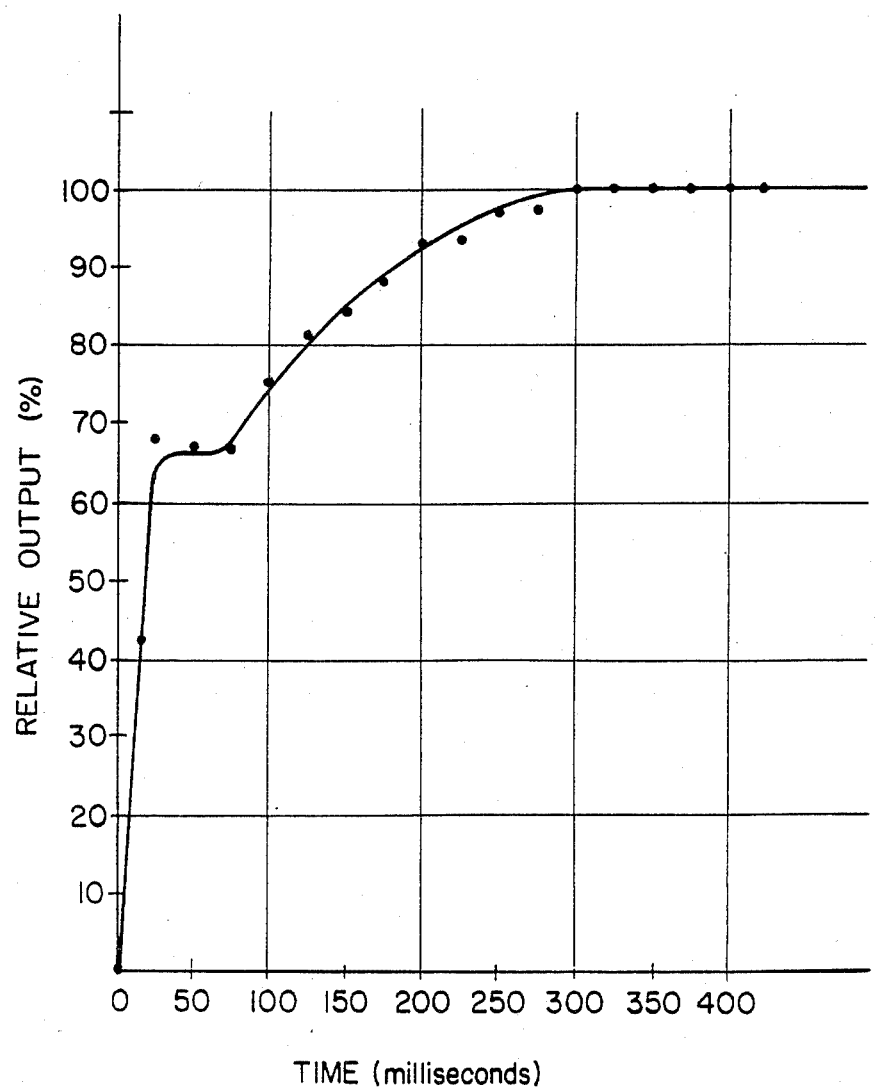
FIG. 2 is a curve showing a response of a laser to a step input of pump lamp current.

Laser 20 produces a laser beam 22 having a wavelength of about 1.06 micrometers which is fed to a beam coupler 24 whose purpose is to combine the high-power laser beam with a low-power visible aiming source 26. The combined beams 28 from the coupler enter a beam launch system 30 for coupling the beam to a laser beam delivery system such as an optical fiber. The laser beam delivery system directs the beam towards the work site. For maximum stability and rapid stabilization as pump power is varied, the laser resonator is chosen to operate in the region where $dw_o/df$ is small, with $w_o$ being the radius at the beam waist and f being the focal length of the pumped YAG rod. The laser resonator has been designed to minimize the effects of thermal focussing to provide a fast rise time of laser output when the pump input is stpped. A rise time of 75 msec can be achieved as shown in FIG. 2.

Figure 3:
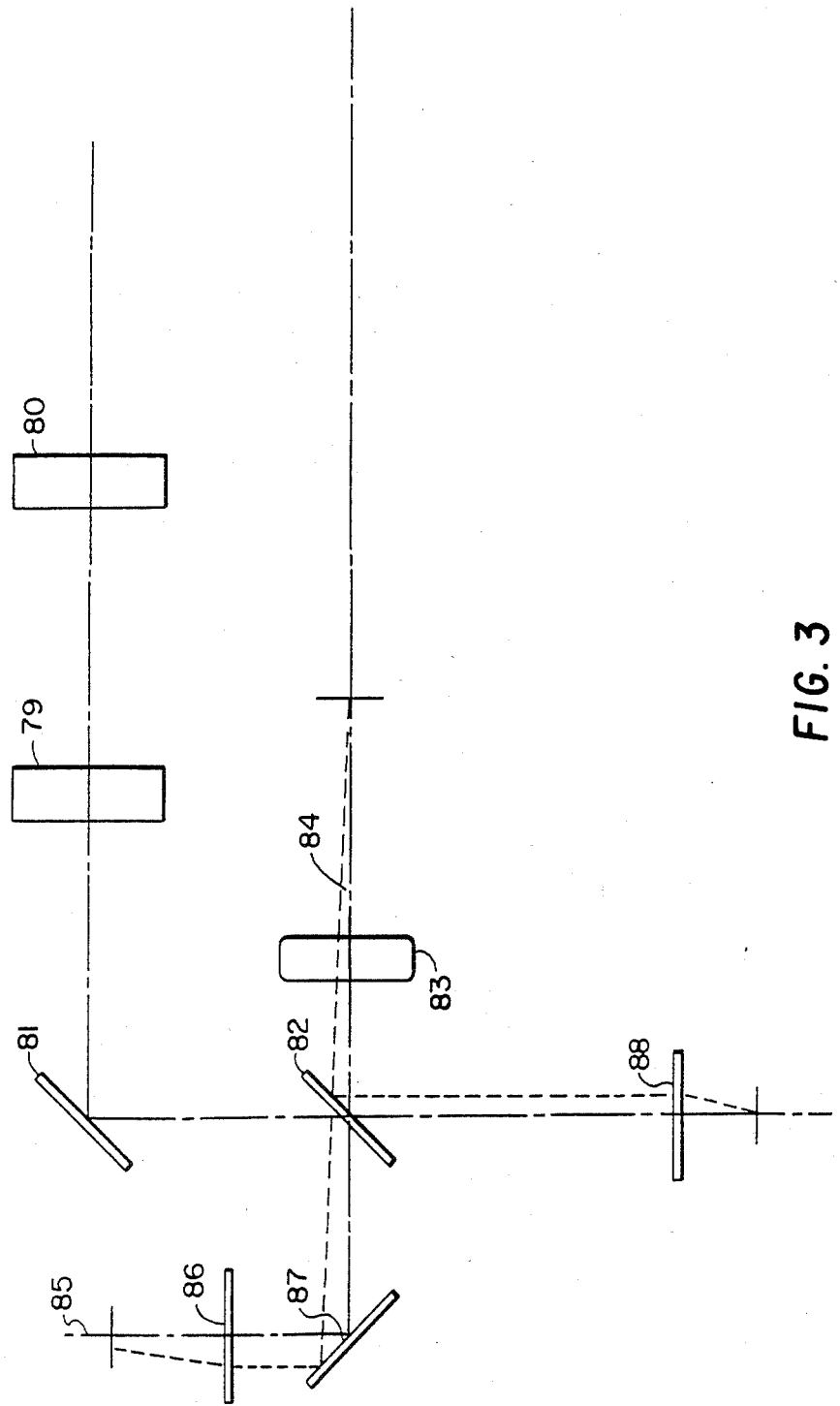
FIG. 3 is an aim/launch optical schematic of the laser.

The Aim and Launch Subsystem (ALS) 30 comprises a HeNe laser coupled colinearly with the YAG beam via a dichroic mirror and then focused at the proximal end of the delivery fiber (FIG. 3). The mechanical tolerances of the optical components and mounts are such that the YAG laser and HeNe laser beams always fall within the clear aperture of the launch, and the HeNe laser beam will be focused within the face of the optical fiber in the fiber delivery system by launch lens 88. A two axis angular adjustment of the YAG laser beam is achieved using Risley prisms to assure that the YAG beam is also focused into the optical fiber by launch lens 88; this is the only adjustment necessary. As shown in FIG. 3, a helium neon laser beam emitted from a laser tube held in mounts 79 and 80 is reflected by mirrors 81 and 82 and focused through fixed dichroic mirror 83 to laser aperture 84. Other elements of the Aim and Launch Subsystem include YAG laser detector fiber 85, detector lens 86, and detector mirror 87. These elements provide an optical feedback signal to the microprocessor control subsystem which is detected and employed to both stabilize the YAG laser output and speed up its response when pump power is varied; the optical signal is achieved by leakage through dichroic mirror 82 and is a fraction of about 0.1% of the main YAG laser beam.

To conserve power consumption and minimize heat generation, when in use the system is maintained in an "idle" state until power is demanded by the user. In this idle state the laser pump lamp is running at an input power of about 100 watts. On command from the operator to provide output power, the pump lamp is switched to its maximum value (about 5.5 Kw) until the detected output from the detector fiber 85 equals the value appropriate to the commanded power. At this point the servo loop is closed thereby adjusting the pump lamp input power to the value required to maintain the YAG laser output constant at this commanded power level.

Figure 4:
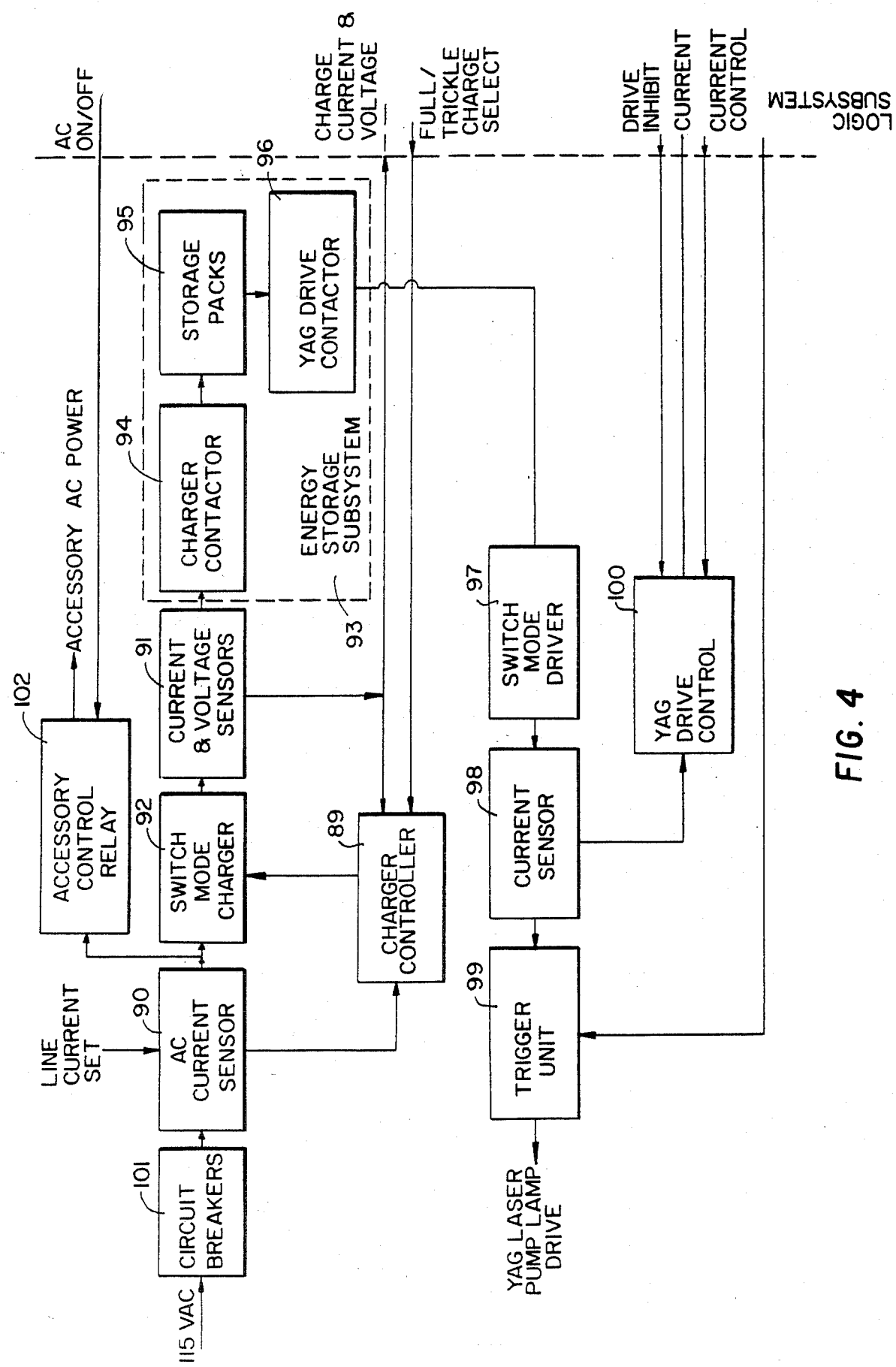
FIG. 4 is a schematic of the power supply and charge of the laser system.

With regard to the 110-120 volt single phase supply embodiment, the Power Supply and Charger (PSC) is a single unit which (a) provides DC current to charge the Energy Storage Cells and (b) provides triggering and DC (YAG) drive to the laser pump lamp. As shown in FIG. 4, a charger controller 89 has an input from AC current sensor 90 as well as through a feedback path from current and voltage sensors 91 whereby it conveys a signal to switch mode charger 92. Thus the charger controller regulates the input to energy storage subsystem 93 which comprises charger contactor 94, storage packs 95 and YAG drive contactor 96.

Current and voltage sensors 91 serve to regulate the charge current to values which are appropriate for safe, long life battery operation; i.e., as the battery approaches the full charge state the charging current is reduced to a trickle level which can maintain this state indefinitely. AC current sensor 90 is an important element which allows the charger to adjust the AC current drawn from the line source to the maximum value allowable without blowing a line fuse or tripping a line-circuit breaker. As seen in FIG. 4, all AC current drawn by the system passes through AC current sensor 90; i.e. both the charger supply current and all other accessory supply current pass through this sensor. AC current sensor 90 is manually adjusted at installation to a value corresponding to the line fusing or circuit breaker current. (In the special case where other electrical equipment may be connected to the same AC circuit, current sensor 90 may be set appropriately below the line fusing or circuit breaker value). In this way the AC current drawn by the charger is adjusted to maintain the total AC current drawn from the line at a value equal to or below the line fusing or circuit breaker value, thus precluding blowing the fuse or tripping the circuit breaker but permitting the charger to operate at the maximum rate possible under that condition and thus recharging the energy storage means at the maximum rate achievable from the given line source. The output through the contactor 96 is used as an input to switch mode driver 97 which in turn provides pump lamp current through current sensor 98 and trigger unit 99. Additionally, on start up, trigger unit 99 provides a high voltage pulse (about 12 Kv) which initiates the YAG laser pump lamp current. Other features of the circuit include safety circuit breakers 101, YAG drive control 100 which receives an input signal from current sensor 98, and the accessory control relay 102.

The Charger is a current regulated switching supply which operates in two states: In the full charge state it is designed to provide the maximum charging current consistent with the fusing of the single phase AC line; i.e., the charging current is adjusted so that the current drawn from the wall equals the fuse or circuit breaker rating. This rating is set via a rear panel potentiometer (not shown). For example, if the line is fused (circuit breaker) at 15 amps, then in the full charge state the charge controller 19 adjusts the charge current so that slightly less than 15 amps is drawn from the line. In the trickle charge state, the charging is approximately 100 ma, a value which can maintain the charge of the storage unit indefinitely.

The YAG drive comprises a second switch mode regulator and controller 97 which is powered by the Energy Storage Unit 93. Control is provided from the the Logic Unit. This section also provides triggering through trigger unit 99 to ignite the laser pump lamp.

Safety circuits included in the Power Supply and Charger of FIG. 4 include (a) AC circuit breakers 101 to prevent excessive AC current drain;

(b) Trigger enable to prevent premature firing of the laser pump lamp; and (c) Laser power inhibit input signal to YAG drive control to prevent the power supply from turning on except on command.

The Energy Storage Subsystem 93 comprises the DC storage cells 95 and safety interlocks (not shown) and contactors 96 to prevent personnel and equipment hazards.

Five separate storage packs of 36 volts each are series connected through contacts of two contactors. The contactors are driven by low voltage (24 volt) AC through all of the enclosure interlocks. If any interlock is opened (cover removed) from the unit or the unit unplugged from the wall, the contacts of the contactors drop out, breaking the storage unit into five individual packs of 36 volts each. This value is below the value of 55 volts DC set as a personnel hazard standard in IEC Publication 449, 1973.

Opening an interlock or unplugging the system also deactivates one of the contactors which disconnects the Energy Storage subsystem 93 from the YAG drive 97, further eliminating the possibility of laser operation. This contactor is also driven through a Key switch and toggle output, (not shown) so that when the key is off and/or when the unit is in laser off state the power supply cannot turn on (it is disconnected from its power source).

Finally, an Emergency switch (not shown) is located on the front panel of the unit which, when depressed, latches off and disconnects the AC drive to all contactors totally disconnecting the Energy Storage Packs 95 and the YAG Drive.

Figure 5:
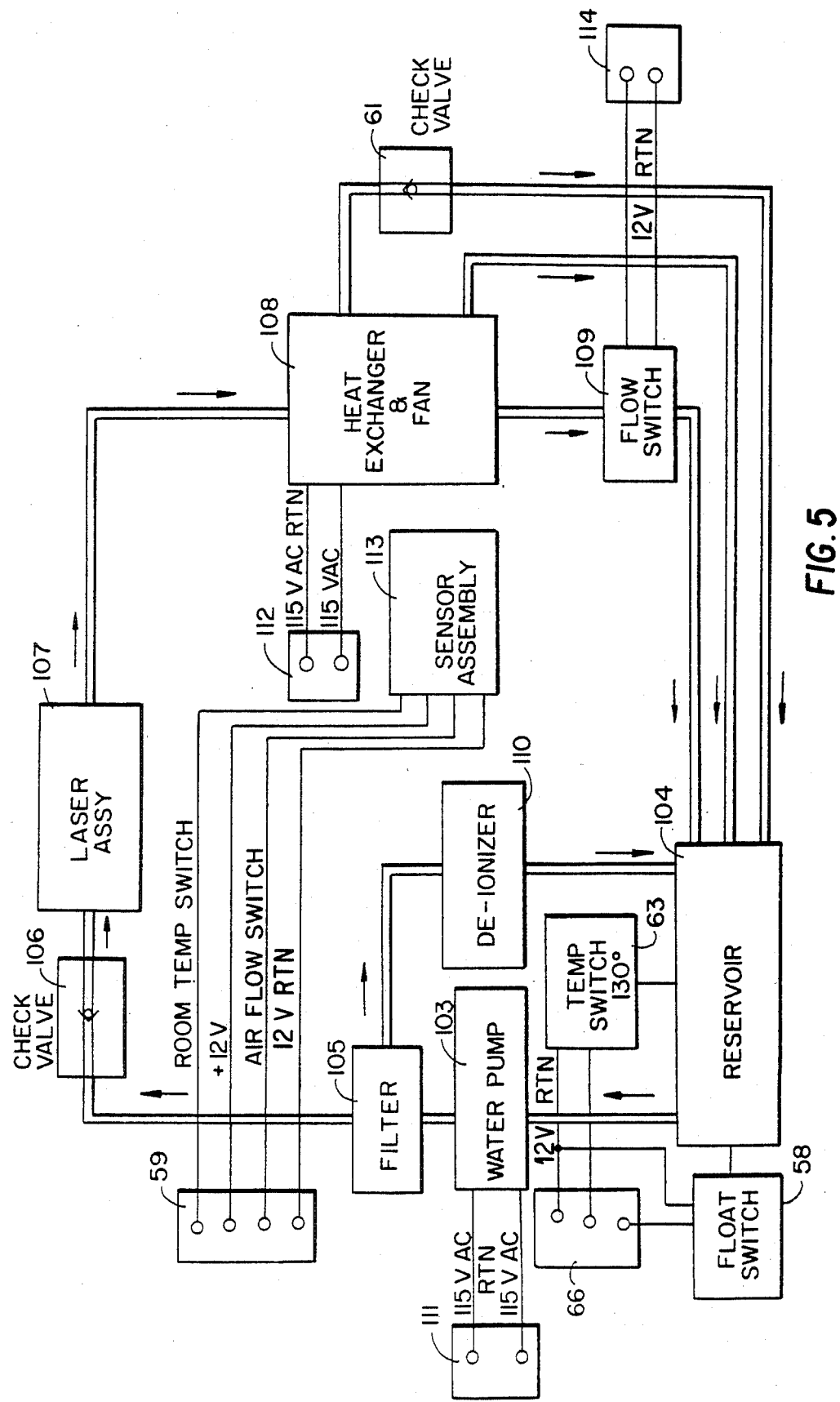
FIG. 5 is a schematic of the base cooler subscription.

The cooler is a closed loop water cooler which exchanges heat to forced air via a fan cooled radiator (FIG. 5). A bypass deionizer and in line filter are provided to maintain water cleanliness and high resistivity to prevent damage to the laser head. The components are selected for noncontamination (stainless steel and plastic) in water and for operation at high temperature which permits heat removal to ambient air in the radiator.

As shown in FIG. 5 water pump 103 takes water from reservoir 104 and passes it in series through filter 105, check valve 106, laser assembly 107, heat exchanger 108, and flow switch 109 which returns the water to reservoir 104. A bypass path from filter 105 to reservoir 104 includes deionizer 110 which functions to remove copper ions which may have been generated during water flow and which could be detrimental to the material in the laser. Panels 111 and 112 respectively provide 115 volt AC inputs to water pump 103 and heat exchanger 108. 12 VDC power to sensor assemply 113 and signals from a room temperature switch, and an air flow switch are conducted from panel 59. Likewise, flow switch 104 sends its signal through panel 114.

A feedback path from heat exchanger 55 to reservoir 57 occurs through check valve 61. When the unit is off this valve opens allowing air to bleed into heat exchanger 108 and the water to drain out to reservoir 104 which is mounted at the lowest point in this system. Temperature switch 63, which is mounted in reservoir 57 and float switch 58 sends signals through panel 66.

As mentioned previously, heat is removed from the water by exchange with forced air in heat exchanger and fan 108.

The 120 VAC single phase embodiment of the invention includes a self-contained $CO_2$ supply (FIG. 6) to provide gas for use in procedures requiring coaxial gas in the fiber delivery system. A rear panel connection for external gas supply is also provided for use with $CO_2$ or other gases as required.

The self-contained gas is provided in a size five disposable tank holding 5 pounds of $CO_2$. This is sufficient for over 150 procedures of 10,000 joules each with gas flow at 40 ml/sec.

The flow is adjusted via a motor driven regulator and displayed on the control panel in liters/min. A low gas sensor is provided to indicate when the gas supply is down to about 30 procedures.

Figure 6:
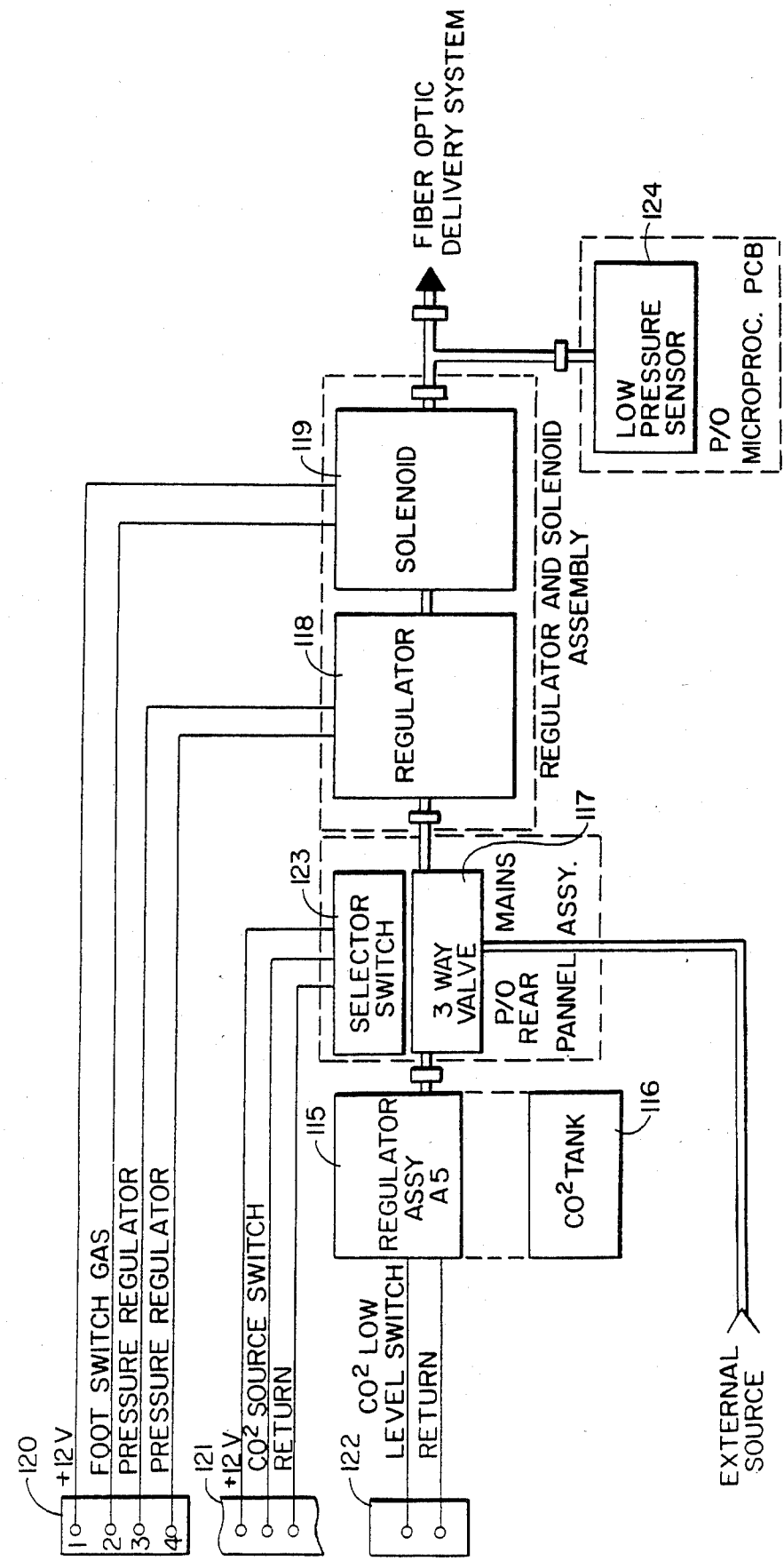
FIG. 6 is a schematic of the gas subsystem.

As shown in FIG. 6, regulator assembly 115 obtains gas from a self contained carbon dioxide tank 116 and passes it in series through three way valve 117 regulator 118, and solenoid 119 to the fiber optic delivery system. Panel 120 provides DC power and footswitch signal inputs to solenoid 119, as well as positive and negative inputs to regulator 108. Panel 121 provides positive DC power and a carbon dioxide source switch input, from selector switch 123. Panel 122 provides carbon dioxide low level switch connection from regulator assembly 115. As mentioned previously, an external gas supply may also be provided to three way valve 117. Low pressure sensor 124 is provided to indicate when the gas supply is down to about 30 procedures.

The logic unit is based on the 8097 processor, a single-chip microcomputer with on-board RAM (random access memory) and I/O. The I/O includes eight analog ports with D/A or A/D functions which permit direct interface with system analog sensors and controls.

Figure 7:
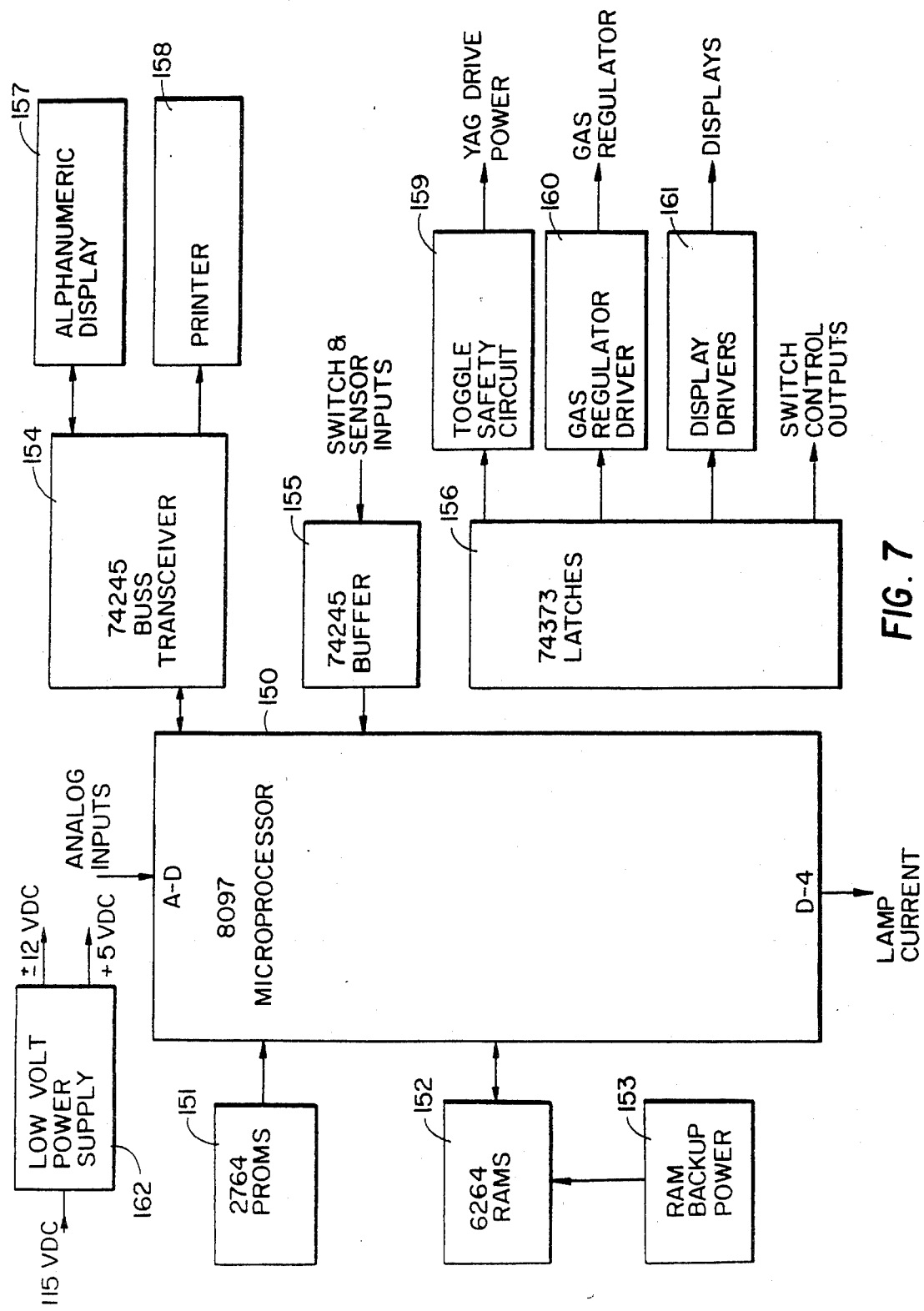
FIG. 7 is a logic diagram of the microprocessor circuit controlling the laser system.

As shown in FIG. 7, the heart of the logic system is the 8097 microprocessor 150. It receives information from 2764 PROMs (Programmable Read Only Memory) 151, and exchanges information with 6264 random access memory 152. The random access memories have back up power unit 153.

The bus transceiver 154 exchanges information with alpha numeric display 157 and sends information to printer 158. The 8097 microprocessor also receives switch and sensor input information from the 74245 buffer 155.

Additional components of the logic include the 74373 latches module 156 which delivers information to the safety circuit 159, the gas regulated driver 160, and the display driver 161 conveys switch control output.

Low volt power supply 162 converts 115 volts AC to low DC voltages for use in the logic system.

Figure 8:
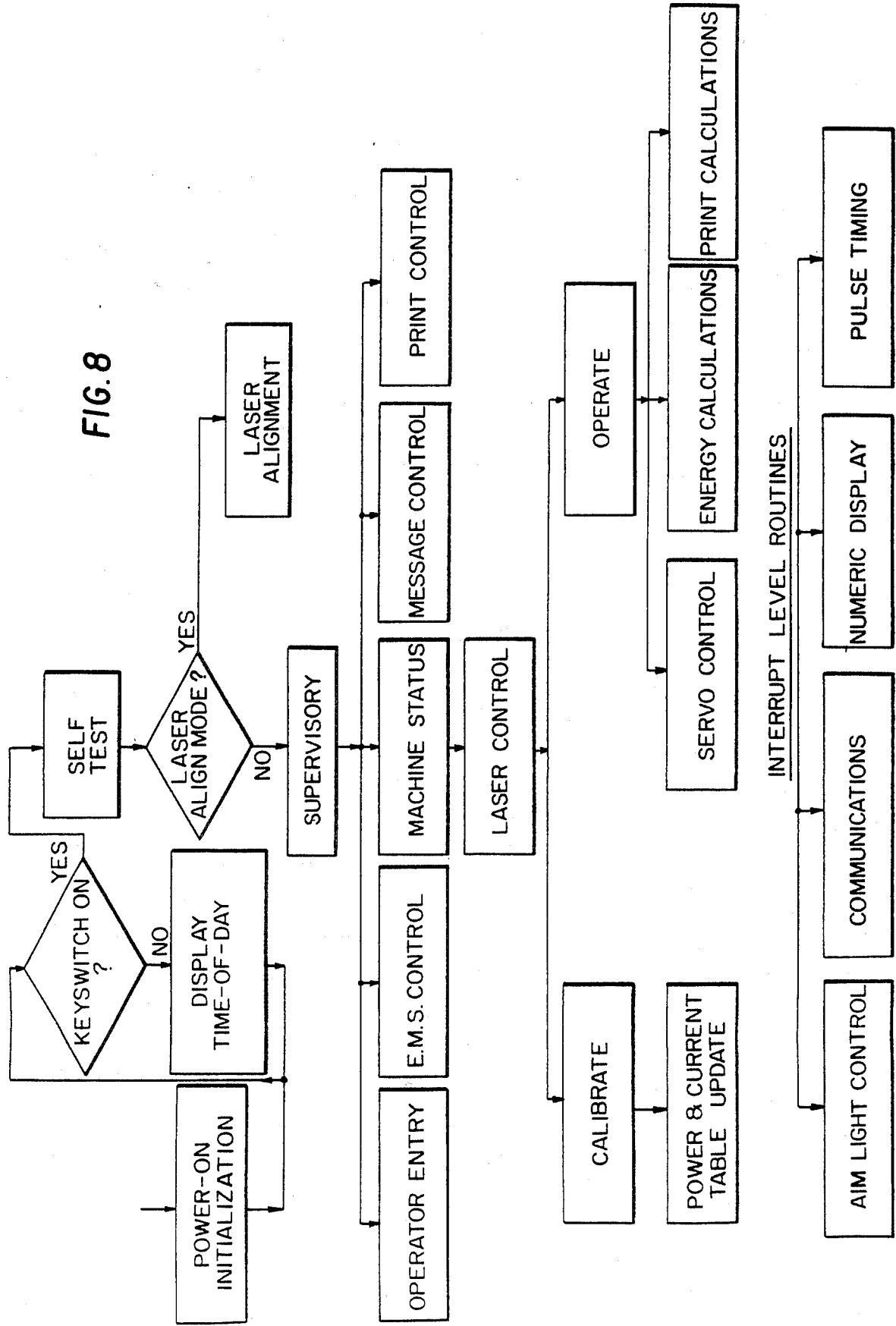
FIG. 8 is a flow chart showing how software implements the functions of the microprocessor circuiting shown in FIG. 9.

The software is structured around two routines which operate in the processor; a main routine and an interrupt routine. The flow charts of FIG. 8 outline the operation.

Finally, the logic may be best understood by following the sequence of events from system plug-in through a typical procedure as presented in the attached Table 1.

The 120 volt single phase embodiment of the present invention is designed to eliminate potential hazards for the patient, operators, and service personnel. Safety features fall into two classes: (1) laser safety and (2) electrical safety.

With regard to laser safety, attached Table 2 indicates the steps required to activate lasing and the safety features incorporated to prevent this occurring accidentally due to machine failure or human error. As can be seen there are a series of actions required to achieve lasing and various safety elements in place until lasing occurs. Most significant are (1) the laser power supply is disconnected from its source (the ESU) until the system is placed in STANDBY or ON by the user.

(2) the intracavity shutter is disabled until the unit is in ON and the first footswitch position depressed.

(3) the laser input power is below the lasing threshold until the footswitch is fully depressed (the final step for lasing).

(4) the laser intracavity shutter is closed until the footswitch is fully depressed. Thus there are two conditions to prevent lasing (input power below threshold and the intracavity shutter) which are in place until the final command for lasing.

Finally, special safety features have been incorporated in the logic hardware and software to prevent accidents due to faults or human error.

Most significant is the use of the separate hardware toggle circuit which controls the laser power supply together with the microprocessor. In the event that the processor stops running or fails to proceed through both the main program or the interrupt routine in the proper sequence, the AC toggle signal stops and the external toggle circuit times out in 2 milliseconds, breaking the drive to an ESU contractor disconnecting the source from the Laser Power Supply which then turns off unconditionally.

The objective of the invention can be further understood by analysis of some typical applications. For illustrative purposes, several applications in laser surgery have been selected. These applications all incorporate endoscopic procedures which can be and are presently performed in a physician's office or outpatient area. The purpose of the invention herein described is to enable the physician to perform surgical procedures simultaneously with the endoscopic procedure.

The YAG laser, which emits radiation at a wavelength of 1.064 μm, is employed in several medical disciplines for either photocoagulation of bleeding lesions, thermal necrosis of malignant or benign tumors or photoablation of tumors and obstructing tissue. Examples of such procedures are the coagulation of AVM's in the GI tract, ablation of obstructing tumors in the GI or pulmonary tract to open the lumen, necrosis of tumors in the bladder and photoablation of the endometrium as a treatment for menorrhagia.

Dosage in these and other procedures is controlled by two parameters: the power of the emitted laser radiation ("power") and the duration for which radiation is emitted ("duration"). The product of these two parameters, together with estimated elapsed time for a procedure are given in Table 3. Note that the "elapsed time for a procedure" includes the period involving patient transport, patient preparation, time between treatments, etc., i.e. it may be defined as the typical time between the start of one treatment and the start of the following treatment. The actual time for which lasing occurs, equal to the total energy divided by the power, is also given and can be seen to be a small fraction of the elapsed procedure time (typically of the order of 1-10%). As a result, the average power drain and heat load during the entire procedure cycle is much less than the peak required while lasing.

Although the above indicates the average duty cycle during a procedure, the duty cycle itself is a function of the time period and power. That is, for very short periods, the system may operate continuously, while when observed over longer periods the duty cycle is less. Observations of typical procedures provides the following duty cycle requirements for operation at maximum power (100 watts emitted from fiber optic delivery system with 5.0 KW input) (Table 3).

TABLE 3

EFFECTIVE DUTY CYCLE FOR OPERATION AT 100 WATTS OUTPUT

| TIME OF OBSERVATION | MAXIMUM TIME IN VARIOUS STATES | | | EFFECTIVE LAMP DUTY CYCLE |
|---|---|---|---|---|
| | ON | STAND-BY | OFF | |
| 10 Sec. | 10 Sec. | — | — | 100% |
| 1 Min. | 48 Sec. | 12 Sec. | — | 80% |
| 10 Min. | 4 Min. | 6 Min. | — | 40% |
| 30 Min. | 8 Min. | 12 Min. | 10 Min. | 27% |
| 1 Hr. | 12 Min. | 15 Min. | 30 Min. | 20% |
| 6 Hrs. | 0.1 Hr. | 1.5 Hr. | 4 Hrs. | 8% |

The effective lamp duty cycle is the percent of lamp power applied on average relative to the maximum lamp power.

The duty cycle requirements for operation at 50% of maximum power (50 watts emitted from the fiber optic delivery system with 3.2 KW input) is given in Table 4.

TABLE 4

EFFECTIVE DUTY CYCLE FOR OPERATION AT 50 WATTS OUTPUT

| TIME OF OBSERVATION | MAXIMUM TIME IN VARIOUS STATES | | | EFFECTIVE PUMP DUTY CYCLE |
|---|---|---|---|---|
| | ON | STAND-BY | OFF | |
| 10 Sec. | 10 sec. | — | — | 64% |
| 1 Min. | 1 Min. | — | — | 64% |
| 10 Min. | 8 Min. | 2 Min. | — | 51% |
| 30 Min. | 20 Min. | 10 Min. | — | 43% |
| 1 Hr. | 30 Min. | 15 Min. | 15 Min. | 32% |
| 6 Hr. | 2 Hr. | 1 Hr. | 3 Hr. | 21% |

Maximum Power requirements to operate the laser power supply, chiller, charger logic and system logic in each state are:

| | ON | STANDBY | OFF |
|---|---|---|---|
| Laser | 5500 Watts | 150 Watts | — |
| Chiller | 500 Watts | 500 Watts | — |
| Logic/Charger | 200 Watts | 200 Watts | 200 Watts |

-continued

| | ON | STANDBY | OFF |
|---|---|---|---|
| TOTAL | 6200 Watts | 850 Watts | 200 Watts |

When connected to a standard 20 AMP wall power source capable of providing approximately 2 KW, the energy storage unit will provide 4000 watts in the ON state, while 1150 and 1800 watts will be available to recharge the energy storage unit in the STANDBY and OFF states respectively. The net energy taken from the energy storage unit is given in Table 5.

TABLE 5

NET ENERGY FROM ENERGY STORAGE UNIT

| TOTAL DURATION | ENERGY USED | WALL ENERGY SUPPLIED | NET ENERGY FROM BATTERY |
|---|---|---|---|
| 10 Sec. | 62 KJ | 20 K | 42 KJ |
| 1 Min. | 308 KJ | 120 K | 590 J |
| 30 Min. | 3.71 MJ | 3.60 MJ | 110 KJ |
| 1 Hr. | 5.59 MJ | 7.20 MJ | — |
| 6 Hrs. | 18.63 MJ | 43.20 MJ | — |
| (a) For 100 watt output | | | |
| 10 Sec. | 42 KJ | 20 K | 22 KJ |
| 1 Min. | 252 KJ | 120 K | 132 J |
| 10 Min. | 2.12 MJ | 1.20 MJ | 92 KJ |
| 30 Min. | 5.55 MJ | 3.60 MJ | 1.95 MJ |
| 1 Hr. | 8.51 MJ | 7.20 MJ | 1.31 MJ |
| 6 Hrs. | 44.1 MJ | 43.20 MJ | 900 KJ |
| (b) For 50 watt output | | | |

The maximum drain from the battery with these cycles is under 2 MJ. This amount of energy can be supplied from sealed-cell batteries (e.g. Gates Cells) or other types. For example, 90, 8-Amp-hour cells have a total storage capacity of 5 MJ.

After the battery is fully drained, it can be recharged in less than 2 hours at a rate of 1 KW. (In FIG. 1 the charger is diagrammatically shown as being connected to the battery 16 which in turn is connected to laser power supply 18. However, it should be understood that in practice all batteries have only one set of terminals and since the charger is on continuously, both the charger 12 and the battery 16 feed power to supply 18).

The system may be customized for specific applications. For example, if the laser is used for surgery, it may be provided with an optional Endo pump 36 for suction, a light source 38 for endoscopic illumination and a gas control 40 for cooling and cleaning the distal tip of the fiber delivery system.

The system described above (including the optional equipment of FIG. 1) has been packaged into a small unit which is 24" wide, 16" deep and 40" high and weighs about 200 pounds. This unit is mounted on wheels so that it can be moved freely from one surgical site to another. More particularly, the front wheels swivel while the other wheels are fixed for easier movement.

Furthermore, because of its small size, the unit can be easily stored while it is not in use, or is being charged. Thus, since a permanent installation is not required, valuable space is saved in the operating room, which may be used for other important instruments.

Obviously, numerous modifications may be made to the invention without departing from its scope as defined in the appended claims.

TABLE 1

PROCEDURE SUMMARY

| ACTION | FUNCTION | STATE | DISPLAY CHANGE |
|---|---|---|---|
| 1. | Memory backed up. | System in Limbo. | None. |
| 2. Plug-in to AC line. | Processor initiated, charger activated. | Energy storage on full or trickle charge depending on state of charge. Switches disabled. | Status: Clock display. All other displays off. |
| 3. Turn key on. | Switches and displays enabled. Test routine initiated. | As above except switches enabled. | (1) Test sequence; (2) Status: "SET POWER". All other displays read "O". Laser Status: OFF. |
| 4. Set power with UP/DOWN arrows. | Select duration. | As above. | Power display: Selected power. Status: "SET DURATION". |
| 5. Set duration with UP/DOWN arrows. | Select duration. | As above. | Duration display: Selected duration. Status: "INSTALL FIBER". |
| 6. Install fiber. | Prepares fiber delivery system. | As above except launch shutter open. | Status: "SYSTEM OPERATIONAL". |
| 7. Depress footswitch. Set gas flow with UP/DOWN arrows. | Set gas flow. | Gas flowing. | Gas flow display: Selected flow. |
| 8. Insert distal end into calibration port. | Calibrate. | Automatic calibration if power set to "O". Otherwise manual calibrate at selected power. | If power set to "O", status: "AUTO CALIBRATE". Otherwise status: "CALIBRATE". Duration display: "1.0". |
| 9. Depress "STANDBY". | Activate laser lamp. | Cooler on (pump and blower running). Laser on (lamp initiated at idle current). Laser shutter disabled. Laser Status: | "STANDBY". |
| 10. Depress "ON". | Enable laser shutter. | As above except laser shuttter enabled. | Laser Status: "ON". |
| 11. Depress footswitch. | Initiate gas flow and lasing. | Automatic calibration if power set to "O". Otherwise manual calibrate at selected power. | Status: If power within ±10% on auto calibrate - "SYSTEM CALIBRATED". If power outside range - "REPLACE FIBER". manual calibrate displays output power. |
| 12. Remove distal end of fiber from calibration port. | Return to STANDBY in operational mode. | As in "8". | Status: "SYSTEM OPERATIONAL". Laser Status: "STANDBY". |
| 13. Depress "ON". | Enable laser shutter. | As in "9". | Laser Status: "ON". |

TABLE 1-continued

PROCEDURE SUMMARY

| ACTION | FUNCTION | STATE | DISPLAY CHANGE |
|---|---|---|---|
| 14. Depress footswitch. | Initiate gas flow and lasing. | Normal operation. | Pulse Energy and Total Energy displays read appropriate values. |
| 15. Between lasing sessions (anticipated delay of 3 minutes or more) depress "OFF" or if not switches depressed for 10 min. | Turn laser and cooler off. | As in "5". | Laser Status: "OFF". |
| 16. Reactivate by depressing "ON". | Laser and cooler initiated. | As in "9". | Laser Status: "ON". |
| 17. At end of procedure turn key off. | Return to charging state. | As in "2". | As in "2". |

TABLE 2

LASER SAFETY FEATURES

| STATE | ACTION | CONDITION | SAFETY EFFECT |
|---|---|---|---|
| AC unplugged. | | No AC power to pull in Contactors K1, K2, and K3. | No AC power. Energy Storage Unit separated into safe 36V X packs. Laser power supply is not powered and cannot operate. |
| | Plug in AC line cord. | | |
| Key off. | | Energy Storage Unit (ESU) on charge. ESU disconnected from laser power supply. | Laser power supply is not powered and cannot operate. |
| | Turn key on. | | |
| Laser status "OFF". | | ESU on charge. ESU disconnected from laser power supply. | Laser power supply is not powered and cannot operate. |
| | Depress Standby. | | |
| Laser status "STANDBY" Set power/ duration. | | Cooler on. Power supply on. Lamp ignited at "idle" current. Intracavity laser shutter disabled. | Laser input power below threshold. Intracavity laser shutter closed. Launch shutter closed. |
| | Depress ON. | | |
| Laser status "STANDBY" Install fiber. | | Cooler on. Power supply on. Lamp ignited at "idle" current. Intracavity laser shutter disabled. | Laser input power below threshold. Intracavity laser shutter closed. Launch shutter closed. |
| | Insert Fiber Delivery System. | | |
| Laser status "STANDBY" System operational. | | Cooler on. Power supply on. Lamp ignited at "idle" current. Intracavity laser shutter disabled. | Laser input power below threshold. Intracavity laser shutter closed. Launch shutter open. |
| | Depress ON. | | |
| Laser status "ON". | | Cooler on. Power supply on. Lamp ignited at "idle" current. Intracavity laser shutter enabled. | Laser input power below threshold. Intracavity laser shutter closed. Launch shutter open. |
| | Room door open. | | |
| Room interlock open. | | Cooler on. Power supply on. Lamp ignited at "idle" current. Intracavity laser shutter disabled. | Laser input power below threshold. Intracavity laser shutter closed. Launch shutter open. |

| AC POWER OFF | ENERGY PACKS DISCONNECTED | COOLER OFF | LASER POWER SUPPLY DISCONNECTED | LASER POWER SUPPLY SWITCHED OFF |
|---|---|---|---|---|
| X | X | X | X | X |
| | | X | X | X |
| | | X | X | X |

| LASER POWER INPUT BELOW THRESHOLD | INTRACAVITY SHUTTER DISABLED | INTRACAVITY SHUTTER SAFETY DISABLED | INTRACAVITY SHUTTER CLOSED | LAUNCH SHUTTER CLOSED |
|---|---|---|---|---|
| X | X | X | X | X |
| X | X | X | X | X |
| X | X | X | X | X |

TABLE 2-continued

| LASER SAFETY FEATURES | | | | |
|---|---|---|---|---|
| X | X | X | X | X |
| X | X | X | X | X |
| X | X | X | X | |
| X | | X | X | |

| STATE | ACTION | CONDITION | SAFETY EFFECT |
|---|---|---|---|
| | Close remote interlock. | | |
| Laser status "ON". | | Cooler on. Power supply on. Lamp ignited at "idle" current. Intracavity laser shutter disabled. | Laser input power below threshold. Intracavity laser shutter closed. Launch shutter open. |
| | Depress footswitch to first position. | | |
| Gas flow. | | Cooler on. Power supply on. Lamp ignited at "idle" current. Intracavity laser shutter enabled. Gas flows. | Laser input power below threshold. Intracavity laser shutter closed. Launch shutter open. |
| | Depress footswitch to second position. | | |
| LASING. | | Input power at lasing level. Intracavity shutter open. | Laser output. |

| AC POWER OFF | ENERGY PACKS DISCONNECTED | COOLER OFF | LASER POWER SUPPLY DISCONNECTED | LASER POWER SUPPLY SWITCHED OFF |
|---|---|---|---|---|
| | | | | X LASING |

| LASER POWER INPUT BELOW THRESHOLD | INTRACAVITY SHUTTER DISABLED | INTRACAVITY SHUTTER SAFETY DISABLED | INTRACAVITY SHUTTER CLOSED | LAUNCH SHUTTER CLOSED |
|---|---|---|---|---|
| | X | | X | |
| X | | | X | |

What is claimed is:

1. An energy management circuit comprising
   a laser;
   an AC input with a maximum power level;
   a DC source of energy operating in conjunction with said AC input and functioning to provide supplementary power as needed for operation of said laser, when the system power drain is more than the maximum power level available from the AC input thus enabling the laser system to operate at an input power level which is higher than said maximum power level of said AC input; and
   a charging unit serving to supply energy to the DC source of energy when the system power drain for operation is less than said maximum power level from said AC input.

2. The energy management circuit of claim 1 further comprising an AC current sensor connected in series with said AC input, a charger controller having an input from said AC sensor and an output which controls the charger to limit AC sensor and an output which controls the charger to limit AC current drain to a preset value.

3. The energy management circuit of claim 1 further comprising a drive contactor module connected to an output of said DC source of energy and contactors which interconnect sections of said DC source of energy and further comprising means for deactivating said contactors to eliminate the possibility of laser operation.

4. The energy management circuit of claim 1 further comprising a cooling system for said laser, said cooling system having:
   a liquid reservoir;
   means for connecting said liquid pump to a head of said laser;
   a heat exchanger connected between said laser head and said reservoir; and
   means for automatically filling said connecting means with liquid only when said laser head is in operation.

5. The circuit of claim 4 wherein said means for connecting said liquid pump to said laser head comprises a liquid filter and said circuit further comprises a deionizer connected in a feedback path to an output of said filter and having an output to said reservoir.

* * * * *